(12) United States Patent
Herrala et al.

(10) Patent No.: US 12,005,764 B2
(45) Date of Patent: Jun. 11, 2024

(54) REAR DOOR ASSEMBLY

(71) Applicant: NISSAN NORTH AMERICA, INC., Franklin, TN (US)

(72) Inventors: Christopher Herrala, Milford, MI (US); David Kovie, Livonia, MI (US)

(73) Assignee: Nissan North America, Inc., Franklin, TN (US)

( * ) Notice: Subject to any disclaimer, the term of this patent is extended or adjusted under 35 U.S.C. 154(b) by 0 days.

(21) Appl. No.: 17/586,671

(22) Filed: Jan. 27, 2022

(65) Prior Publication Data
US 2023/0234429 A1    Jul. 27, 2023

(51) Int. Cl.
| | |
|---|---|
| *B60J 5/12* | (2006.01) |
| *B60J 5/10* | (2006.01) |
| *E05D 15/58* | (2006.01) |
| *E05F 15/611* | (2015.01) |

(52) U.S. Cl.
CPC ............. *B60J 5/12* (2013.01); *B60J 5/106* (2013.01); *E05D 15/583* (2013.01); *E05F 15/611* (2015.01)

(58) Field of Classification Search
CPC ....... E05D 15/583; E05F 15/611; B60J 5/106; B60J 5/12
See application file for complete search history.

(56) References Cited

U.S. PATENT DOCUMENTS

| | | | |
|---|---|---|---|
| 4,620,743 A | 11/1986 | Eke | |
| 5,921,611 A | 7/1999 | Townsend | |
| 5,997,072 A * | 12/1999 | Parkinson | B60J 5/12 296/146.8 |
| 6,234,563 B1 | 5/2001 | Bascou | |
| 6,386,613 B1 | 5/2002 | Vader | |
| 7,188,863 B2 | 3/2007 | Tiesler et al. | |
| 7,828,366 B2 | 11/2010 | Andre et al. | |
| 7,866,728 B2 * | 1/2011 | Suzuki | E05F 15/603 296/146.4 |
| 8,020,912 B2 | 9/2011 | Lounds | |
| 8,376,449 B2 | 2/2013 | Kitayama et al. | |
| 2002/0060479 A1 * | 5/2002 | Tolinski | B60J 7/043 296/51 |

(Continued)

FOREIGN PATENT DOCUMENTS

| | | | |
|---|---|---|---|
| CN | 1590196 A | | 3/2005 |
| DE | 199 07 391 | * | 8/2000 |

(Continued)

*Primary Examiner* — Gregory J Strimbu
(74) *Attorney, Agent, or Firm* — Global IP Counselors, LLP (57) ABSTRACT

A rear door assembly having a bracket, a rear door, a first movement mechanism and a second movement mechanism. The rear door has a lateral side with a slot formed therein. The first movement mechanism is attached to a rearward area of a vehicle body structure and is configured to move the bracket and the rear door from a closed orientation covering a rear opening in the vehicle body structure to at least an intermediate orientation partially uncovering the rear opening. The bracket has a pair of support pins extending in that extend into the slot with the support pins being supported on rollers within the slot. The second movement mechanism is disposed within the rear door to move the rear door relative to the support pins of the bracket along the slot.

4 Claims, 7 Drawing Sheets

(56) References Cited

U.S. PATENT DOCUMENTS

| | | | | |
|---|---|---|---|---|
| 2006/0197357 | A1* | 9/2006 | Catania | E05D 15/58 |
| | | | | 296/155 |
| 2007/0158973 | A1* | 7/2007 | Kolbl | B60J 5/12 |
| | | | | 296/146.8 |
| 2009/0120003 | A1* | 5/2009 | Bochen | E05F 15/616 |
| | | | | 49/340 |
| 2009/0255185 | A1* | 10/2009 | Schachtl | E05F 15/63 |
| | | | | 49/334 |
| 2017/0145727 | A1* | 5/2017 | Yamagata | F16H 25/20 |
| 2018/0171693 | A1* | 6/2018 | Vega | E05D 15/0604 |
| 2023/0241949 | A1* | 8/2023 | Fuentes | E05D 15/582 |
| | | | | 701/49 |
| 2023/0243202 | A1* | 8/2023 | Kovie | B60J 5/106 |
| | | | | 49/334 |

FOREIGN PATENT DOCUMENTS

| | | | |
|---|---|---|---|
| DE | 10 2004 050 228 | * | 4/2006 |
| FR | 2 865 162 | * | 7/2005 |
| KR | 10-0512188 B1 | | 9/2005 |
| KR | 10-1068172 B1 | | 9/2011 |
| WO | 2005/080108 A1 | | 9/2005 |
| WO | 2015/097321 A1 | | 7/2015 |

* cited by examiner

REAR DOOR ASSEMBLY

BACKGROUND

Technical Field

The present disclosure generally relates to a rear door assembly. More specifically, the present disclosure relates to rear door assembly with a rear door that undergoes pivotal movement about a shaft of a bracket that supports the rear door and both curved movement and linear movement along a slot of that supports the rear door to the bracket.

Background Information

Sports utility vehicles, vans and other automotive structures can include a rear door that pivots upward to expose a rear opening of the vehicle. Due to design constraints and dimensional constraints, such rear doors typically can only pivot up to a point only slightly higher that the top of the rear opening of the vehicle. With the rear door in the open orientation, the rear door can create difficulties in instances where irregularly shaped objects are desired to be placed within the rear of the vehicle. Further, with the door in the open orientation, the rear door can also create difficulties for tall persons loading objects into the rear of the vehicle.

SUMMARY

One object of the present disclosure is to provide a vehicle that includes a rear opening with a rear door that pivots upward with a bracket that supports the rear door and additionally slides forward relative to the bracket such that more than half of the rear door is located above a rear portion of a roof structure of the vehicle.

In view of the state of the known technology, one aspect of the present disclosure is to provide a rear door assembly the at least one bracket has a shaft pivotally supported by a rearward area of a vehicle body structure. The bracket includes a pair of support pins extending in inboard directions and are spaced apart from one another. The rear door has at least one lateral side with a slot formed therein with the support pins extending into the slot. The support pins are retained within the slot for sliding movement with respect to the rear door such that the rear door can slide relative to the bracket and the rear of the vehicle body structure. The first movement mechanism is attached to the rearward area of the vehicle body structure and is configured to move the rear door from a closed orientation covering a rear opening in the vehicle body structure to at least an intermediate orientation partially uncovering the rear opening. The second movement mechanism is disposed within the rear door such that with the rear door moved to at least the intermediate orientation, the second movement mechanism moves the rear door relative to the support pins along the slot from at least the intermediate orientation to a fully open orientation thereby fully exposing the rear opening.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
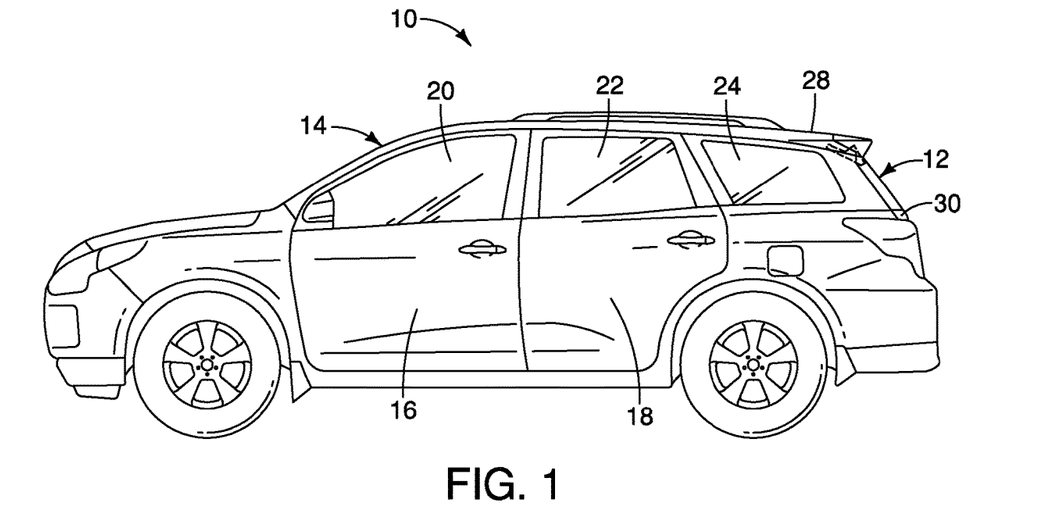
FIG. 1 is a side view of a vehicle that has a rear opening with a rear door, the rear door being in a closed orientation covering the rear opening in accordance with a first embodiment.
Figure 2:
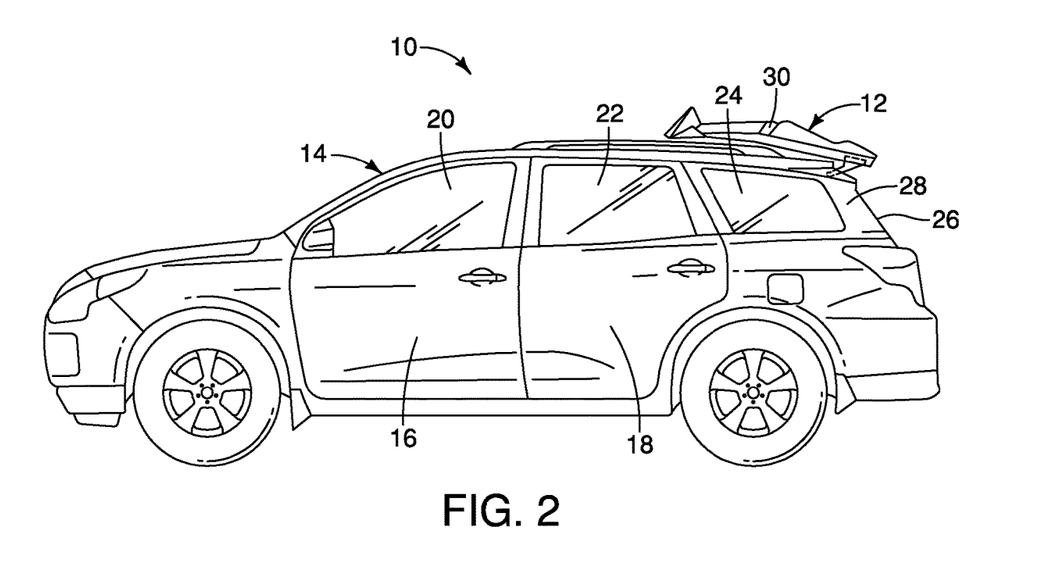
FIG. 2 is another side view of the vehicle similar to FIG. 1 showing the rear door in a fully open orientation with the rear door being at least partially located above a rearward area of the roof structure of the vehicle in accordance with the first embodiment.

Referring initially to FIGS. 1 and 2, a vehicle 10 having a rear door assembly 12 is illustrated in accordance with a first embodiment.

The vehicle 10 includes a vehicle body structure 14 that includes, among other features and components, side doors 16 and 18, side windows 20, 22 and 24, and a rear opening 26 (FIG. 3) at a rearward area 28 of the vehicle body structure 14 of the vehicle 10. The rear door assembly 12 includes a rear door 30 that is attached to the vehicle body structure 14 via a shaft 32 rigidly and non-movably fixed to a bracket 34 for movement between a closed orientation shown in FIG. 1 and a fully open orientation shown in FIG. 2. As shown in FIGS. 2, in phantom in FIG. 3 and in FIG. 7, with the rear door 30, between 60 and 90 percent of the rear door 30 is located above a roof structure of the vehicle body structure 14 thereby exposing the rear opening 26 to make loading and unloading cargo easier without much, if any, interference from the rear door 30. In the depicted embodiments, it is also possible for the rear door 30 to be located completely above the roof structure when in the fully open orientation.

Figure 3:
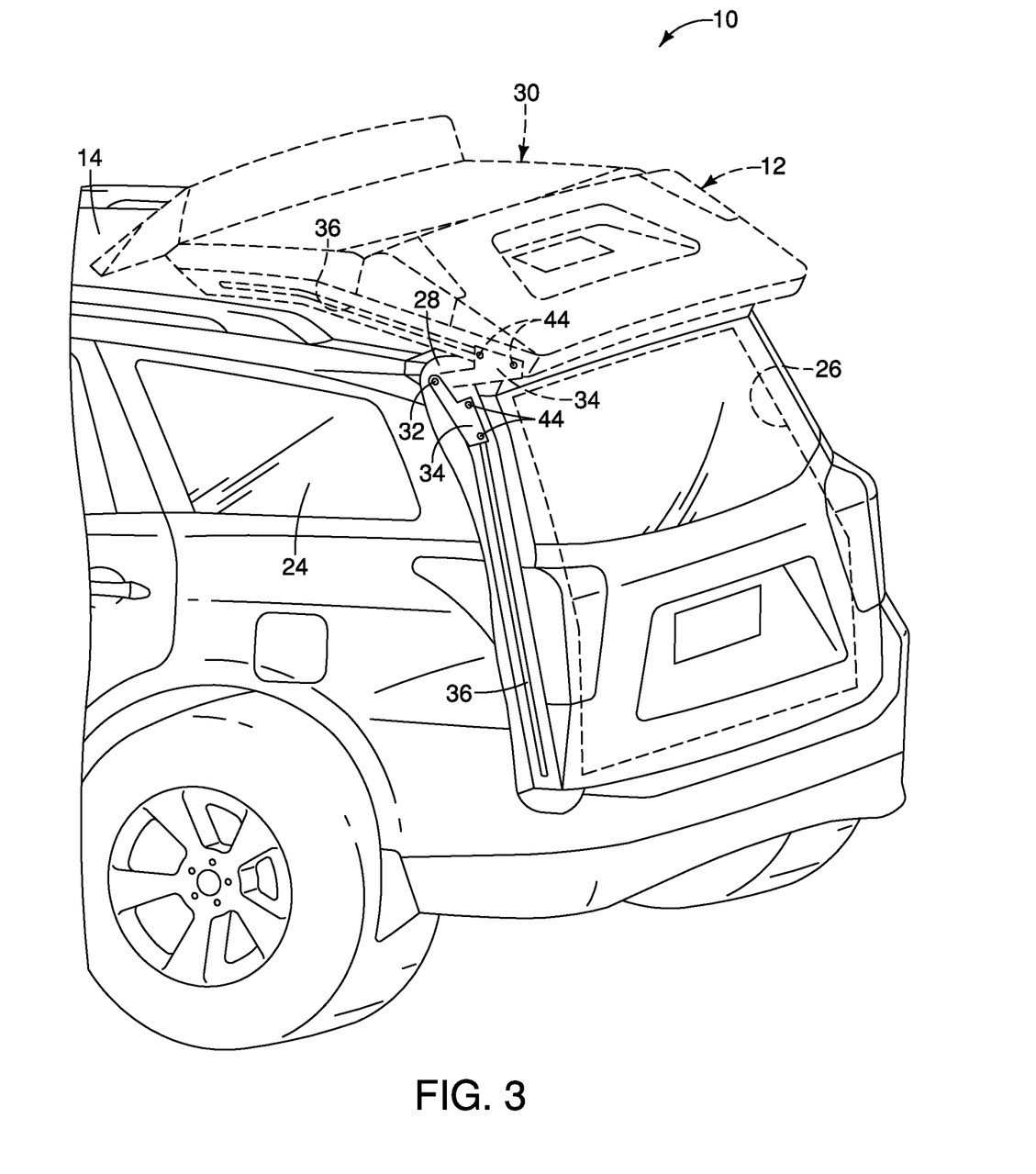
FIG. 3 is a perspective view of the rearward portion of the vehicle showing the rear door in the closed orientation in solid lines and in the fully open orientation in phantom lines in accordance with the first embodiment.
Figure 5:
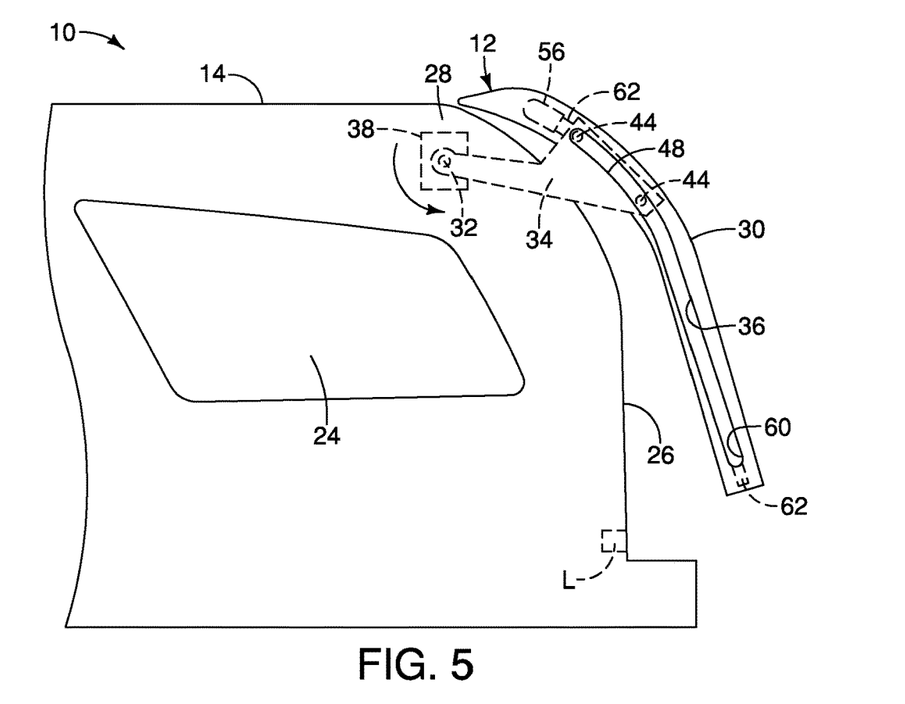
FIG. 5 is a second side schematic view of the vehicle similar to FIG. 4 showing the rear door pivoted by the motor and the bracket to a first intermediate orientation such that the rear door begins to expose the rear opening of the vehicle, with the pins or shafts of the bracket being located at a upper end of the slot in accordance with the first embodiment.
Figure 6:
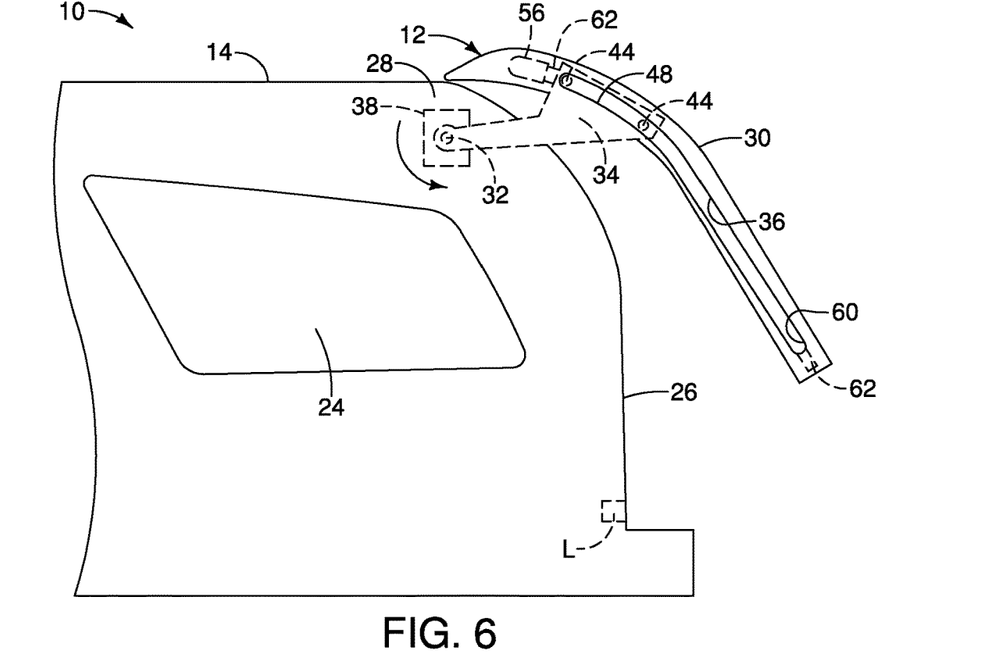
FIG. 6 is a third side schematic view of the vehicle similar to FIGS. 4 and 5 showing the rear door further pivoted by the motor and the bracket to a second intermediate orientation with the rear door further exposing the rear opening of the vehicle, with the pins or shafts of the bracket remaining at the upper end of the slot in accordance with the first embodiment.
Figure 7:
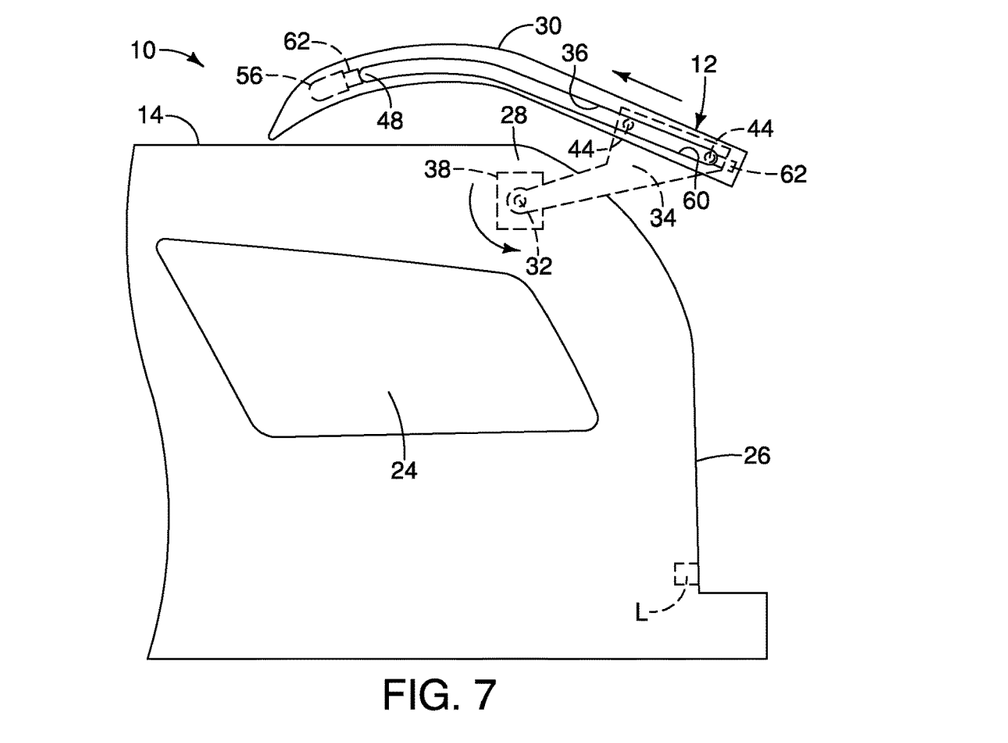
FIG. 7 is a third side schematic view of the vehicle similar to FIGS. 4-6 showing the rear door further pivoted by the motor and the bracket and the linear motor having moved the rear door with the pins or shafts of the bracket being located at a bottom portion of the slot such that the rear door is shown in the fully open orientation fully exposing the rear opening of the vehicle in accordance with the first embodiment.

In FIGS. 4-7, the vehicle body structure 14 and the rear door 30 are shown schematically with simplified and exaggerated block-like shapes to demonstrate the kinematics of the movement of the rear door 30 from the closed orientation (FIGS. 3 and 4), to intermediate orientations (FIGS. 5 and 6) and then to the fully open orientation (FIG. 3 in phantom lines and FIG. 7).

As shown in FIGS. 3-7, the rear door 30 includes a slot 36. Although only one slot 36, one bracket 34 and one shaft 32 are shown in the drawings, it should be understood from the drawings and the description herein that there are two slots 36, two brackets 34 and two shafts 32 at opposite lateral sides of the rear door 30. Specifically, there is one shaft 32, one bracket 34 and one slot 36 provided on a passenger's side (a lateral side) of the rear door 30 and another shaft 32, another bracket 34 and another slot 36 provided on a driver's side (another lateral side) of the rear door 30. The shafts 32, the brackets 34 and the slots 36 are functionally identical but are mirror images of one another being on opposite sides of the rear door 30. Therefore, only one of the shafts 32, one of the brackets 34 and one of the slots 36 is described herein below for the sake of brevity.

Figure 8:
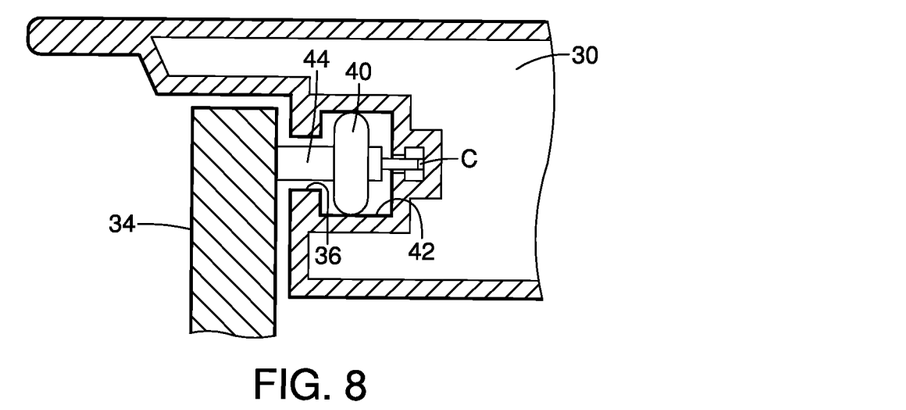
FIG. 8 is a cross-sectional schematic rear view of a portion of the rear door taken along the line 8-8 in FIG. 4, showing rollers on the pins or shafts of the bracket, the rollers being retained within a track defined within the slot, the pins or shafts of the bracket being connected to a cable that is attached to the linear motor in accordance with the first embodiment.
Figure 9:
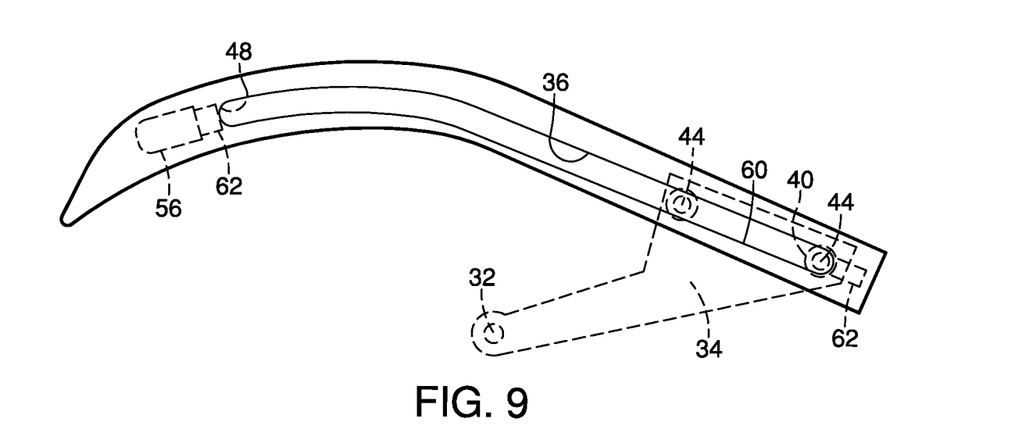
FIG. 9 is a schematic side view of the rear door removed from the vehicle showing the slot of the rear door, the bracket, pins or shafts and rollers of the bracket along with the linear motor (in phantom) and a slot movement sensor (in phantom) located at the upper end of the slot and another slot movement sensor located at a lower end of the slot in accordance with the first embodiment.

As shown in FIGS. 8 and 9, the bracket 34 is not directly attached to the rear door 30. Rather, the bracket 34 includes at least two rollers 40 that are confined within a track 42 that is adjacent to the slot 36 such that shafts 44 (also referred to as pins 44) of the rollers 40 extend through the slot 36 and into the track 42. When the rear door 30 moves relative to the bracket 34 (as described below), the rollers 40 move along the track 42 with the shafts 44 undergoing corresponding movement relative to the slot 32.

Figure 10:
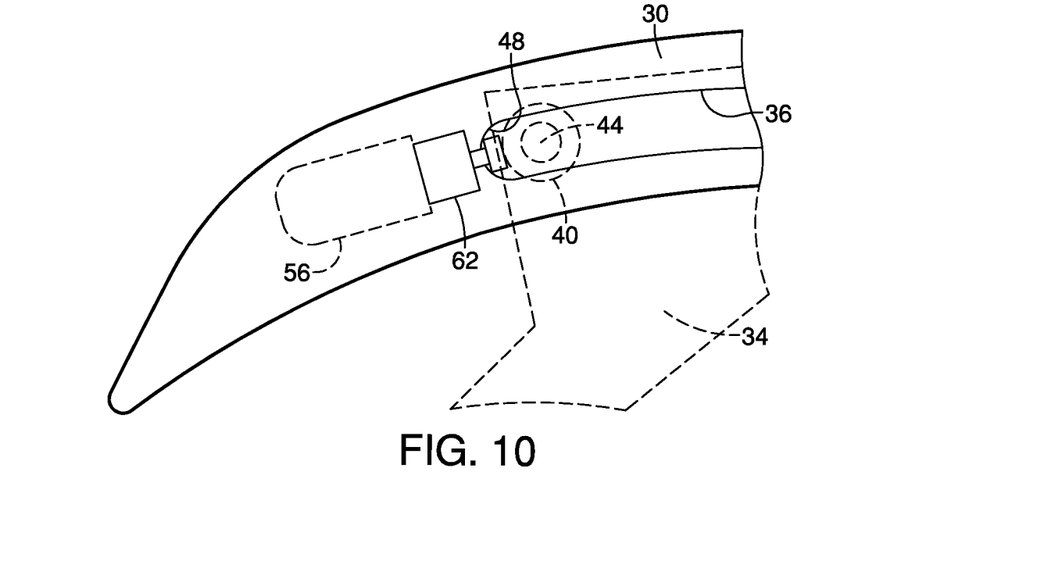
FIG. 10 is a schematic side view of the rear door showing the slot of the rear door, the bracket, pins or shafts and rollers of the bracket showing the slot movement sensor (in phantom) located at the upper end of the slot in accordance with the first embodiment.

As shown in FIGS. 4-7 in the first embodiment, the shaft 32 of the bracket 34 extends into a motor 38 (a first movement mechanism), with the motor 38 defining a remainder of the shaft 32 (for example, bearings within the motor 38 at least partially define the shaft 32). As shown in FIG. 10, there are two motors 38, one on each side of the rearward area 28 of the vehicle 10 that operate in synch with one another, as described below. The motors 38 are configured to control pivoting movement of the brackets 34 about the shafts 32. For the sake of brevity only one of the motors 38 is described herein below.

Figure 4:
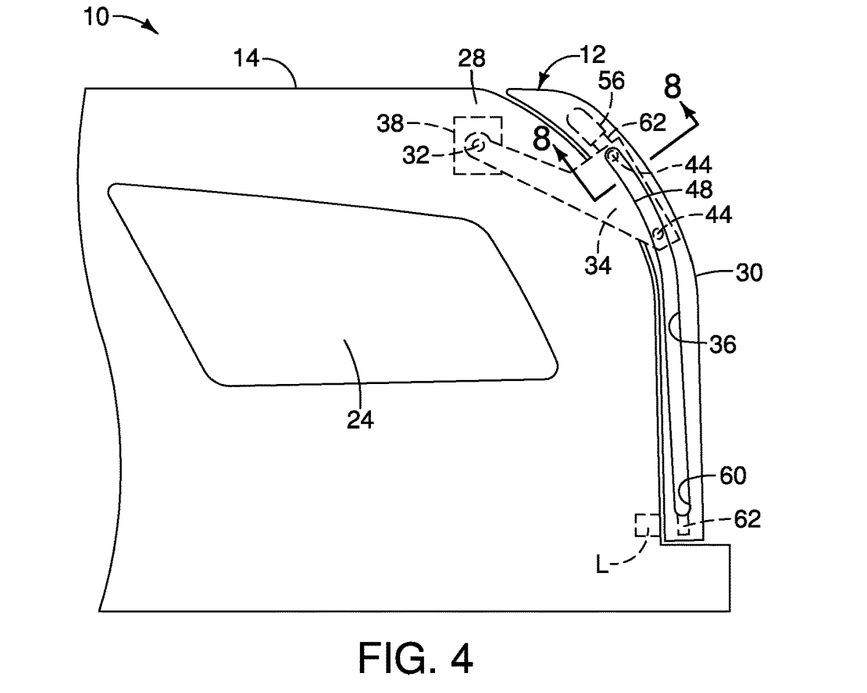
FIG. 4 is a side schematic view of the vehicle depicted in FIGS. 1-3 showing the rear door, a slot formed in one lateral side of the rear door, a bracket having a shaft connected to a motor installed to the vehicle, the bracket having two pins or shafts that extend into the slot of the rear door and a linear motor installed within the rear door for changing the position of the rear door relative to the bracket, with the rear door in the closed orientation in accordance with the first embodiment.
Figure 12:
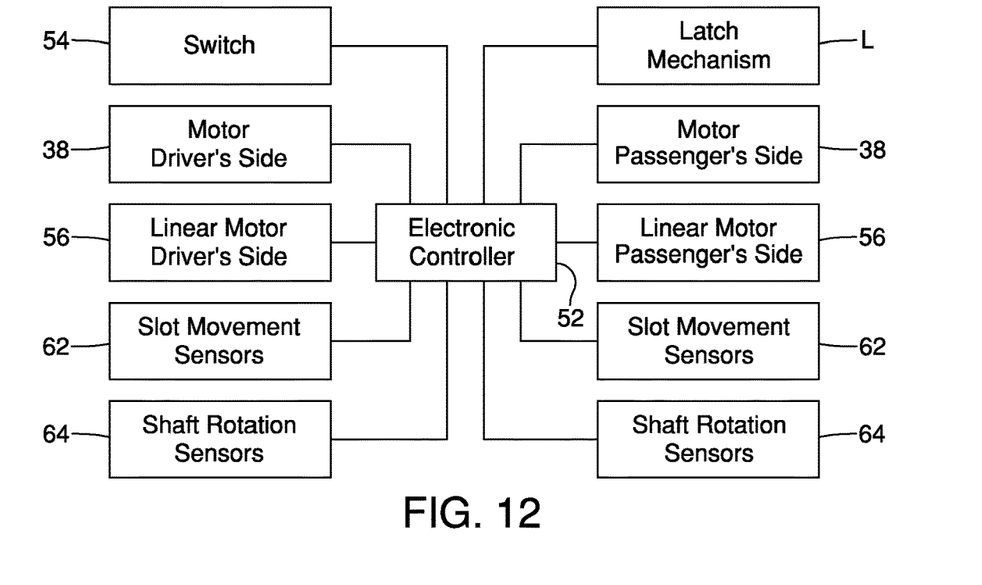
FIG. 12 is a block diagram showing an electronic controller connected to the motors that control pivoting movement of the bracket, the linear motors that control movement of the rear door relative to the bracket and sensors that provide signals to the electronic controller indicated current position and orientation of the bracket and the rear door in accordance with the first embodiment.

As shown in FIGS. 3 and 4, with the rear door 30 in the closed orientation, the shafts 44 and the rollers 40 are located at an uppermost end 48 of the slot 36, and the rear door 30 is located in a lowered position in order to be closed and held shut by a latch mechanism L. As shown in FIG. 12, the motors 38 are electronically connected to an electric controller 52 and operated by the electronic controller 52, as described in greater detail below. It should be noted that the portion of the slot 36 proximate the upper end 48 has a curved shape.

The electronic controller 52 preferably includes a microcomputer with motor control programs that control operation of the motor 38 and the linear motor 56, as discussed below. The electronic controller 52 can also include other conventional components such as an input interface circuit, an output interface circuit, and storage devices such as a ROM (Read Only Memory) device and a RAM (Random Access Memory) device. The electronic controller 52 is operatively connected to each of the elements depicted in FIG. 12 in a conventional manner. The internal RAM of the electronic controller 52 stores statuses of operational flags and various control data. The internal ROM of the electronic controller 52 stores the instructions for various operations of the latch L, the motors 58 and the linear motors 56.

Figure 11:
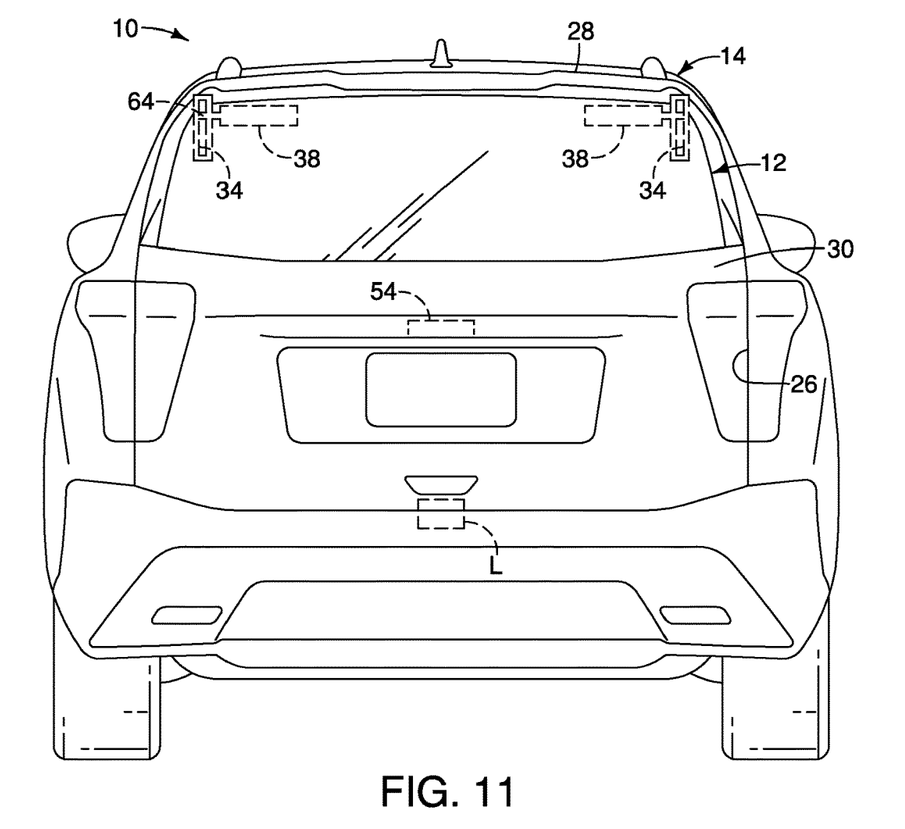
FIG. 11 is a rear view of the vehicle depicted in FIGS. 1-3 with the rear door in the closed orientation showing a latch mechanism and a switch that operates the rear door assembly in accordance with the first embodiment.

When a vehicle operator (not shown) operates a switch 54 within the vehicle 10 and/or on the rear door 30 (FIG. 11), the electronic controller 42 operates the latch mechanism L to unlock the rear door 30 and operates the motors 38 in order to pivot the rear door 30 about the shaft 44 thereby moving the rear door 30 from the closed orientation depicted in FIG. 4 to a first intermediate orientation shown in FIG. 5, then onward to a second intermediate orientation shown in FIG. 6 and further to the fully open orientation shown in FIG. 7.

Once in the rear door 30 is at least in the first intermediate orientation shown in FIG. 5, but no later than with the rear door 30 in the second intermediate orientation shown in FIG. 6, the electronic controller 52 operates linear motors 56 installed within the rear door 30. The linear motors 56 are operated to move the rear door 30 forward relative to the bracket 34. Simultaneously, the motors 38 continue to pivot the rear door 30 upward to the orientation depicted in FIG. 7 until the rear door 30 is fully moved forward as shown in FIG. 7 to the fully open orientation.

The linear motors 56 are attached to corresponding portions of cables C (one on each side of the rear door 30), as shown in FIG. 8. Other portions of the cables C are attached to one or both of the shafts 44, as is also shown in FIG. 8. Each cable C can be arranged like a conveyor belt such that a single linear motor 56 on each side of the rear door 30 can slide the rear door 30 back and forth along the slot 36 in order to position the rear door 30 at the desired end of the slot, depending upon whether the rear door 30 is being moved to the fully open orientation or the closed orientation. Alternatively, a biasing mechanism can be included within the rear door 30 to bias the rear door 30 toward one of the upper end 48 or a lower end 60 of the slot 36, with the linear motor 56 being installed within the rear door 30 to move the rear door 30 relative to the bracket to a corresponding one of the open orientation or the closed orientation.

During the final movements of the rear door 30 toward the fully open orientation, each of the linear motor 56 pulls on the cable C drawing the rollers 40 to a lower end 60 of the slot 36, as shown in FIGS. 7 and 9. As shown in FIG. 9, the roller 40 contacts one of a plurality of slot movement sensors 62 that sends a signal to the electronic controller 52 to stop operating the linear motor 56. A shaft rotation sensor 64 associate with the motor 38 or the shaft 44 sends a signal to the electronic controller 52 when the bracket 34 has been rotated to the fully open orientation shown in FIG. 7 and the electronic controller 52 ceases pivoting the bracket 34. It should be noted that the portion of the slot 36 immediately above the lower end 60 of the slot 36 is basically straight or linear. Thus, the slot 36 has a curved upper section and a straight or linear lower section.

Similarly, when the switch 54 is operated to close the rear door 30, the motor 30 and the linear motor 56 are operated to reverse the above described movements of the bracket 34 and the movement of the rear door 30 relative to the bracket 34. When the slot movement sensor 64 at the upper end 48 of the slot 36 is contacted by one of the rollers 40, as shown in FIG. 10 and the shaft rotation sensor 64 indicates the rear door 30 has been moved to the fully closed orientation shown in FIG. 4, the latch mechanism L is operated to lock the rear door 30.

Although not shown in FIGS. 3-7, the bracket 34 and related elements of the rear door assembly 12 can be concealed by a removable side trim panel that can be installed and removed from the vehicle body structure 14. Such removable side trim panels are located above the rear side windows 24 at the rearward area 28 of the vehicle body structure 14.

Second Embodiment

Figure 13:
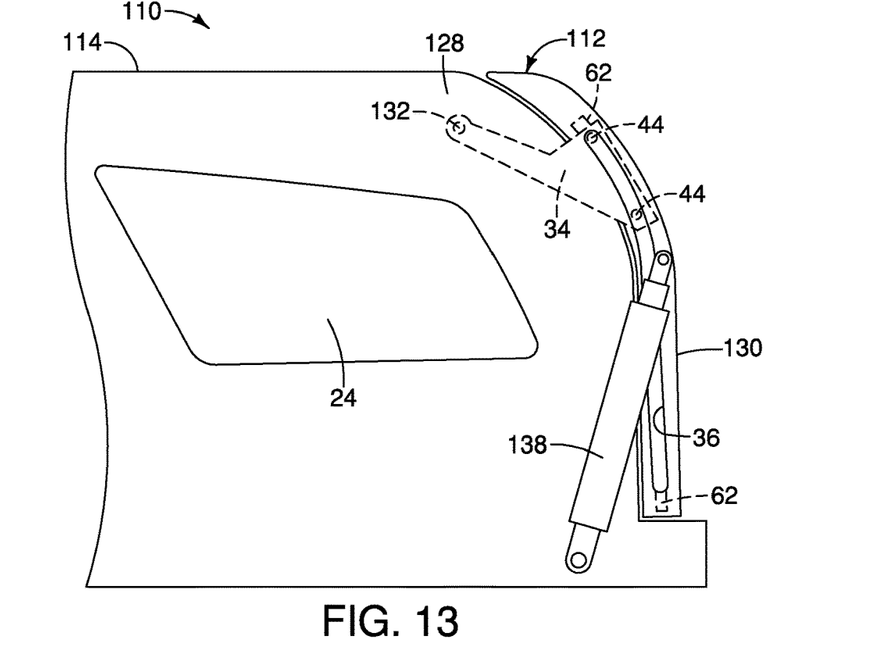
FIG. 13 is a side schematic view of a vehicle showing a rear door, a slot formed in one lateral side of the rear door, a bracket having a shaft connected to a hinge (not shown) within the vehicle, and a linear motor that controls pivoting movement the door about the shaft of the bracket and a linear motor installed within the rear door for changing the position of the rear door relative to the bracket, with the rear door in the closed orientation in accordance with a second embodiment.
Figure 14:
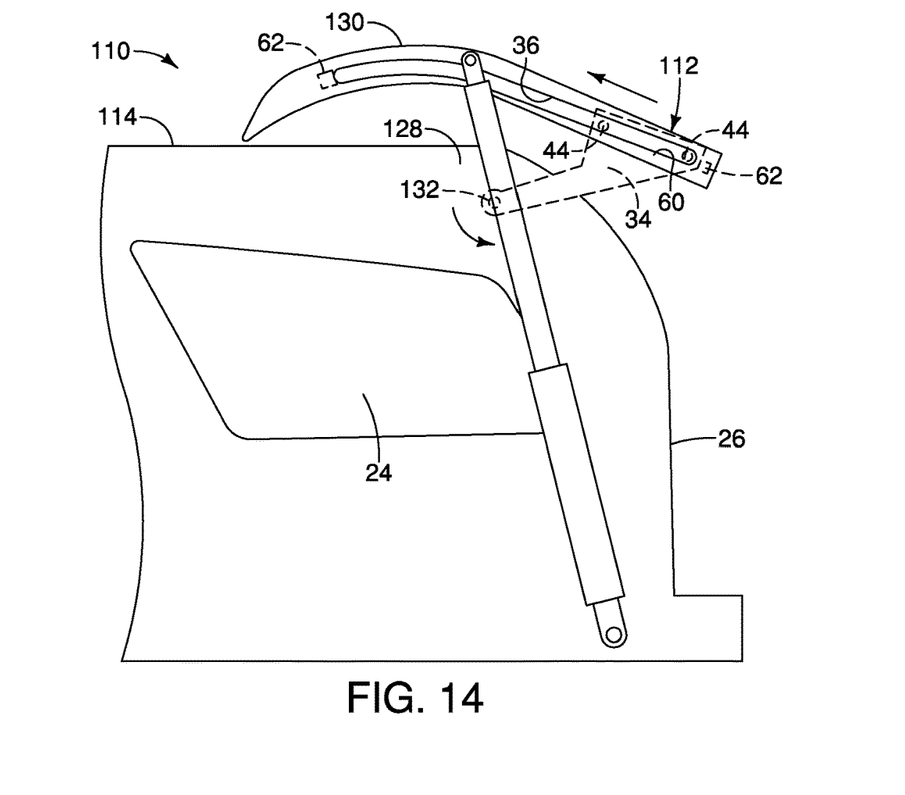
FIG. 14 is another side schematic view of a vehicle showing the rear door in a fully open in accordance with the second embodiment.

Referring now to FIGS. 13 and 14, a rear door assembly 112 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

As shown in FIGS. 13 and 14, the vehicle 110 includes a vehicle body structure 114 that includes a rear door 130 of the rear door assembly 112. The rear door 130 is fixed to the vehicle body structure 114 for pivoting movement about a shaft 132 of a hinge (not shown). Note that in the second embodiment, the motor 38 of the first embodiment has been eliminated and replaced with a linear motor 138 (a first movement mechanism).

The linear motor 138 has a first end fixed to a lower area of the rearward area 128 of a vehicle body structure 114 and an upper end attached to the rear door 130. The linear motor 138 is configured to move from a first length (FIG. 13) to a second overall length (FIG. 14) greater than the first length thereby moving the rear door 130 from the closed orientation to at least the intermediate orientation. As with the first embodiment, the rear door 130 includes the linear motors 56 (not shown). Each motor 38 is a second movement mechanism installed within the rear door 130 in a manner identical to the first embodiment. As in the first embodiment, the linear motor 56 is fixed to the rear door 130 and configured to move the rear door 130 relative to the support pins 44 of the bracket 34 such that the support pins 44 are moved or slid along the slot 36 from a first end of the slot 36 to a second end of the slot. The rear door 130 further includes the slot movement sensors 62 connected to the electronic controller 52. The slot movement sensors 62 send corresponding signals to the electronic controller 52 when a corresponding one of the rollers 40 contact the slot movement sensor 62 informing the electronic controller 52 to cease operation of the linear motors 56.

In the second embodiment, the linear motor 138 can be either an electrically operated device or a hydraulically controlled piston device whose movement is controlled by changes in hydraulic pressure that is in turn controlled by the electronic controller 52. Alternatively, the linear motor 138 can be a pneumatic piston device biased to move the rear door 130 upward toward the fully open orientation shown in FIG. 14.

The various structural elements and components of the vehicle body structure 14 and of the vehicle 10 other than those of the rear door assembly 12 are conventional components that are well known in the art. Since these elements and components are well known in the art, these structures will not be discussed or illustrated in detail herein. Rather, it will be apparent to those skilled in the art from this disclosure that the components can be any type of structure and/or programming that can be used to carry out the present invention.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the rear door assembly. Accordingly, these terms, as utilized to describe the present invention should be interpreted relative to a vehicle equipped with the rear door assembly.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A rear door assembly, comprising:
   a vehicle body structure having a rear area with a side rear window;
   a first motor attached to the rear area of the vehicle body structure above the side rear window;
   a bracket having a first end and a second end, the first end being fixed to the first motor via a shaft having an axis of rotation, the first motor being operable to pivot the bracket about the axis of rotation, the second end having a pair of support pins, distances between the axis of rotation and each of the support pins remaining fixed during pivotal movement of the bracket via operation of the first motor, the pair of support pins extending in an inboard direction of the vehicle body structure and being spaced apart from one another;
   a rear door having at least one lateral side with a slot formed therein with the support pins extending into the slot, the support pins being retained within the slot for sliding movement of the rear door with respect to the support pins;
   the first motor being configured to pivot the bracket and the rear door from a closed orientation where the rear door covers a rear opening in the vehicle body structure to at least an intermediate orientation where the rear door partially uncovers the rear opening;
   a second motor installed within the rear door such that with the rear door moved to at least the intermediate orientation by the first motor, the second motor urges the rear door to move relative to the support pins along the slot from at least the intermediate orientation with the support pins being located proximate a first end of the slot to a fully open orientation where a majority of the rear door is located above the vehicle body structure thereby fully exposing the rear opening with the support pins moved to proximate a second end of the slot; and
   an electronic controller electronically connected to the first motor for controlling the first motor to pivot the bracket and the rear door from the closed orientation to at least the intermediate orientation and the electronic controller being further electronically connected to the second motor to move the rear door from the intermediate orientation to the fully open orientation.

2. The rear door assembly according to claim 1, wherein the slot in the rear door has a straight portion and a curved portion.

3. A rear door assembly, comprising:
   a bracket having a first end and a second end, the first end being fixed to a shaft pivotally supported by a rearward area of a vehicle body structure, the second end having a pair of support pins, distances between the shaft and each of the support pins remaining fixed relative to one another during pivotal movement of the bracket, the pair of support pins extending in an inboard direction of the vehicle body structure and being spaced apart from one another;
   a rear door having at least one lateral side with a slot formed therein with the support pins extending into the slot, the support pins being retained within the slot for sliding movement of the rear door relative to the support pins;
   a linear motor having a first end fixed to a lower area of the rearward area of the vehicle body structure and an upper end attached to the rear door, the linear motor being configured to extend from a first overall length to a second overall length greater than the first overall length thereby moving the rear door from a closed orientation covering a rear opening of the vehicle body structure to an intermediate orientation partially uncovering the rear opening;
   a motor disposed within the rear door and fixed to the rear door, the motor disposed within the rear door being configured to move the rear door relative to the support pins of the bracket such that the support pins are moved within the slot from a first end of the slot to a second end of the slot thereby moving the rear door from the intermediate orientation to a fully open orientation where a majority of the rear door is located above the vehicle body structure and the rear opening is fully exposed; and
   an electronic controller electronically connected to the linear motor for controlling the linear motor to move the rear door from the closed orientation to the intermediate orientation and the electronic controller being further electronically connected to the motor disposed within the rear door to move the rear door from the intermediate orientation to the fully open orientation.

4. The rear door assembly according to claim 3, wherein the linear motor is a pneumatic cylinder and piston device.

* * * * *